(12) United States Patent
Clement et al.

(10) Patent No.: US 11,068,577 B2
(45) Date of Patent: Jul. 20, 2021

(54) TECHNIQUE FOR CONNECTING A MOBILE DEVICE TO A VEHICLE-BASED SYSTEM

(71) Applicant: e.solutions GmbH, Ingolstadt (DE)

(72) Inventors: Martin Clement, Tuebingen (DE); Lukasz Gut, Ulm (DE); Micha Mutschler, Ulm (DE); Andreas Seuss, Ulm (DE)

(73) Assignee: E.SOLUTIONS GMBH, Ingolstadt (DE)

( * ) Notice: Subject to any disclaimer, the term of this patent is extended or adjusted under 35 U.S.C. 154(b) by 388 days.

(21) Appl. No.: 15/491,618

(22) Filed: Apr. 19, 2017

(65) Prior Publication Data
US 2017/0311158 A1 Oct. 26, 2017

(30) Foreign Application Priority Data

Apr. 20, 2016 (EP) .................................... 16000885

(51) Int. Cl.
*G06F 21/00* (2013.01)
*G06F 21/41* (2013.01)
(Continued)

(52) U.S. Cl.
CPC ............. *G06F 21/41* (2013.01); *H04L 9/0643* (2013.01); *H04L 9/0861* (2013.01);
(Continued)

(58) Field of Classification Search
CPC ...... H04W 12/06; H04W 12/04; H04L 63/06; H04L 63/083; H04L 9/0861;
(Continued)

(56) References Cited

U.S. PATENT DOCUMENTS 5,995,624 A 11/1999 Fielder et al.
8,432,260 B2 4/2013 Talty et al.
(Continued)

FOREIGN PATENT DOCUMENTS

| EP | 3582191 A1 * | 12/2019 | ........... B60R 25/246 |
|----|----|----|----|
| SG | 158780 A1 | 2/2010 | |
| WO | 2000067415 A2 | 11/2000 | |

OTHER PUBLICATIONS

Meysam Ghaffari ; Nasser Ghadiri ; Mohammad Hossein Manshaei ; Mehran Sadeghi Lahijani; "P4QS: A Peer-to-Peer Privacy Preserving Query Service for Location-Based Mobile Applications"; IEEE Transactions on Vehicular Technology; Year: Oct. 2017; vol. 66, Issue: 10; Journal Article; pp. 9458-9469 (Year: 2017).*

(Continued)

*Primary Examiner* — Shewaye Gelagay
*Assistant Examiner* — Courtney D Fields
(74) *Attorney, Agent, or Firm* — Tarolli, Sundheim, Covell & Tummino LLP

(57) ABSTRACT

A method for connecting a mobile device with a vehicle-based system is described. The vehicle based-system comprises a first device and a second device that are both in possession of a system key. For an initial connection request between the first device and the mobile device, a token pair comprising a plaintext token and an encrypted token has been provided. The encrypted token is obtainable by applying the system key to at least the plaintext token. The mobile device is connected with the vehicle-based system by receiving, for a subsequent connection request with the second device and from the mobile device, the token pair comprising the plaintext token and the encrypted token. The token pair is verified using at least the system key. The subsequent connection is accepted upon successful verification of the token pair.

18 Claims, 9 Drawing Sheets

(51) Int. Cl.
*H04L 9/32* (2006.01)
*H04L 9/06* (2006.01)
*H04L 9/08* (2006.01)
*H04L 29/06* (2006.01)
*H04L 29/08* (2006.01)
*H04W 12/04* (2021.01)
*H04W 12/06* (2021.01)

(52) U.S. Cl.
CPC .......... *H04L 9/3228* (2013.01); *H04L 9/3242* (2013.01); *H04L 9/3263* (2013.01); *H04L 63/06* (2013.01); *H04L 63/083* (2013.01); *H04L 67/146* (2013.01); *H04W 12/04* (2013.01); *H04W 12/06* (2013.01); *H04L 2209/80* (2013.01)

(58) Field of Classification Search
CPC ... H04L 9/0643; H04L 67/146; H04L 9/3263; H04L 9/3228; H04L 9/3242; H04L 2209/80; G06F 21/41
See application file for complete search history.

(56) References Cited

U.S. PATENT DOCUMENTS

| | | |
|---|---|---|
| 2005/0154887 A1 | 7/2005 | Birk |
| 2006/0153386 A1 | 7/2006 | Ksontini et al. |
| 2007/0174456 A1 | 7/2007 | Yellepeddy |
| 2012/0117637 A1 | 5/2012 | Little et al. |
| 2015/0045013 A1 | 2/2015 | Simmons |
| 2015/0254441 A1* | 9/2015 | Sanso ................. G06F 21/41 726/9 |
| 2015/0304324 A1* | 10/2015 | Kirsch ............... H04L 63/0876 726/5 |

OTHER PUBLICATIONS

Menezes A., et al.; "Chapter 1: Overview of Cryptography", in Handbook of Applied Cryptography, CRC Press, pp. 1-48, Oct. 1996; XP001525001, ISBN: 978-0-8493-8523-0; Retrieved from: http//www.cacr.math.unwaterloo.ca/hac.

European Patent Application No. 16000885.0; Applicant: e.solutions GmbH; Examination Report; dated Nov. 13, 2018; 5 pgs.

European Application No. 16000885.0-1870; Filed Apr. 20, 2016; "Entitled: Technique for Connecting a Mobile Device to a vehicle-Based System"; European Search Report; Date of Completion: Oct. 5, 2016; 7 pp.

Chris Palmer, "Secure Session Management With Cookies for Web Applications"; XP055305783, Retrieved from the Internet: URL:https://crypto.stanford.edu/cs142/papers/web-session-management.pdf [retrieved on Sep. 27, 2016] *setion 3.1 and annex D*; 18 pp.

Manual, "Bluetooth Specification Version 4.2, 5 Security Overview"—Security Architecture; Dec. 2, 2014, pp. 85-96.

Applicant: e.solutions GmbH; European Patent Application No. 16000885.0-1218; Summons to attend oral proceedings; Chairman: Thierry Bec; dated May 14, 2020; 7 pgs.

* cited by examiner ly more ways for providing information and entertainment to passengers by way of onboard devices. For example, as costs have decreased and technology has developed, multimedia devices have become ubiquitous in vehicles. Modern vehicles may offer an integrated system of multiple devices for use by a driver or another passenger. Each device may be individually controllable and therefore used to provide multimedia content or other information to a particular occupant. Moreover, vehicle occupants often have a mobile device such as a smartphone or tablet which they wish to connect to one of the vehicle's devices.

TECHNIQUE FOR CONNECTING A MOBILE DEVICE TO A VEHICLE-BASED SYSTEM

CROSS-REFERENCE TO RELATED APPLICATION

The present application claims priority under 35 U.S.C. § 119 from European Patent Application No. 16 000 885.0, filed 20 Apr. 2016, and entitled TECHNIQUE FOR CONNECTING A MOBILE DEVICE TO A VEHICLE-BASED SYSTEM, which is incorporated herein by reference in its entirety.

TECHNICAL FIELD

The present disclosure generally relates to managing connections between a vehicle-based system and a mobile device. In particular, the present disclosure relates to managing connections between a mobile device and two or more devices of a vehicle-based system. The technique may be embodied in one or more devices, methods, and computer programs.

BACKGROUND

Vehicles support increasingly more ways for providing information and entertainment to passengers by way of onboard devices. For example, as costs have decreased and technology has developed, multimedia devices have become ubiquitous in vehicles. Modern vehicles may offer an integrated system of multiple devices for use by a driver or another passenger. Each device may be individually controllable and therefore used to provide multimedia content or other information to a particular occupant. Moreover, vehicle occupants often have a mobile device such as a smartphone or tablet which they wish to connect to one of the vehicle's devices.

Connecting a mobile device to a device of the vehicle-based system entails a connection process. The user of the mobile device manually approves the connection, upon which credentials are exchanged between the devices. Often at least some user involvement is deemed necessary to ensure the security of both the vehicle-based system and the mobile device.

Excessive security measures will inconvenience the user, especially if perceived as redundant or repetitive. Devices of the vehicle-based system are typically associated with a particular seat of the vehicle. For example, a display device in the dashboard is intended for the driver while a display device installed in the back of the driver seat is intended for the passenger or passengers behind the driver. Hence, occupants of a vehicle may not always wish to connect to the same display device, and yet may consider additional connection procedures to be burdensome where they had only recently approved connection with a different one of the vehicle-based system devices.

Given the security requirements for performing a connection, however, the system may not flexibly allow subsequent connections from third-party devices such as the mobile device. The mobile device and its applications are typically not under control of the OEM. Therefore, although the occupant may have just recently connected their mobile device with one onboard device, they must re-perform the connection process for a different display device of the vehicle-based system. From the viewpoint of the occupant this may seem unintuitive and unnecessary.

SUMMARY

In view of the above, there is a need for a technique for performing connections between a vehicle-based system and a mobile device, wherein the technique avoids one or more of the drawbacks discussed above or other related problems.

According to a first aspect, a method for connecting a mobile device with a vehicle-based system is presented. The vehicle based-system comprises a first device and a second device that are both in possession of a system key. For an initial connection request between the first device and the mobile device, a token pair comprising a plaintext token and an encrypted token has been provided. The encrypted token is obtainable by applying the system key to at least the plaintext token. The method for connecting the mobile device with the vehicle-based system comprises receiving, for a subsequent connection request with the second device and from the mobile device, the token pair comprising the plaintext token and the encrypted token. The method for connecting the mobile device with the vehicle-based system further comprises verifying the token pair using at least the system key. The method for connecting the mobile device with the vehicle-based system further comprises accepting the subsequent connection upon successful verification of the token pair.

It should be appreciated that the vehicle-based system may comprise any arbitrary number of devices. The first device and the second device are referred to for the sake of simplicity. The first device, the second device, and indeed any connectable device of the vehicle-based system may each be operable to perform both the initial connection request and the subsequent connection request. Which device performs a respective aspect of the method may be determined by the order and timeframe in which the the mobile device connects to the devices of the vehicle-based system. Which device performs the initial connection request or the subsequent connection request may therefore depend on an arbitrary choice on the user's part.

The first device may not be connected to the vehicle-based system when the subsequent connection is performed with the second device. Conversely, the second device may not be connected to the vehicle-based system when the initial connection is performed with the first device. As devices of the vehicle-based system are not always powered on, they may not be connected to the vehicle-based system at certain points in time. Hence, the first device may be unable to notify the second device of the initial connection.

The initial connection may have been performed subject to a first user query. The subsequent connection may then be performed without generating any user query or by generating a second user query requiring less user interaction than the first user query. For example, for the initial connection the user may be required to input a code (e.g., a PIN), while the subsequent connection may require a simple user confirmation or no user query at all.

The token pair need not be exchanged between the first device and the second device. As indicated above, the first device and the second device need not be simultaneously connected to the vehicle-based system. The first and second devices moreover do not need to communicate with one another regarding the initial or subsequent connection.

The step of verifying the token pair using at least the system key may further comprise the step of encrypting the plaintext token received from the mobile device using the system key. Verifying the token pair would then comprise the step of comparing the resulting encryption of the plaintext token to the encrypted token received from the mobile device. Thus, the second device can ensure that the received plaintext token was previously encrypted with the system key.

A timestamp may be included in the plaintext token during the initial connection request. The timestamp would then be checked for expiry when the subsequent connection is performed. Expiration of the timestamp can depend on various factors, in order to tailor the level of security and convenience for the user.

Where a timestamp has been included in the plaintext token during the initial connection request, the method for connecting the mobile device with the vehicle-based system may further comprise the step of generating a new token pair having a new timestamp, if the timestamp is not expired. The new token pair is then transmitted to the mobile device. The step of generating a new token pair having a new timestamp may be performed with each subsequent connection from the mobile device.

Moreover, where the initial connection has been performed subject to a first user query, and the subsequent connection is performed without generating the user query or by generating the second user query, and a timestamp has been included in the plaintext token during the initial connection request, the method for connecting the mobile device with the vehicle-based system may further comprise the step of generating a third user query. The third user query may require as much user interaction as the first or second user query (if applicable), to accept the subsequent connection, if the timestamp is expired.

The encrypted token may be obtainable using a one-way algorithm using at least the system key and the plaintext token. For example, the one-way algorithm may be a one-way function such as a cryptographic hash function (e.g., MD5, SHA-1 or SHA2).

The encrypted token may be obtainable by applying the system key to the plaintext token and to a unique identifier indicative of an identity of the mobile device (e.g., a MAC address, IMEI or IMSI). The unique identifier may be derived from the connection between mobile device and the remote system (e.g., using the MAC address and/or a SSL or a TLS client certificate).

Where a unique identifier is used, the method for connecting the mobile device with the vehicle-based system may further comprise the step of receiving the unique identifier from the mobile device. Verifying the token would therefore be based at least on the received unique identifier, the plaintext token, the encrypted token and the system key. Where the unique identifier is transmitted and generated by the mobile device the unique identifier may be based, e.g., on a serial number or a key generated locally in the mobile device.

The method for connecting the mobile device with the vehicle-based system may rely on the same system key being used for all connection requests. That is, all devices of the vehicle-based system, including the first and second device, may use a single system key regardless of which mobile device requests a connection. This same system key may furthermore be relied upon throughout the life of the vehicle-based system. The system key may therefore be hard-coded into the first and second devices.

Further, the method for connecting the mobile device with the vehicle-based system may require that at least a portion of the plaintext token has been randomly generated. Such random generation may be carried out by any known methods. Moreover, any of the devices of the vehicle-based system may be configured to randomly generate the plaintext token.

The method for connecting the mobile device with the vehicle-based system may further comprise the step of establishing an encrypted connection between the vehicle-based system and the mobile device. The encrypted connection may be based on any known encryption protocol (e.g., SSL or TLS). After a connection request is accepted, communication between the mobile device and the vehicle-based system may occur exclusively through encrypted channels. The encrypted connection may be established by sending a digital certificate to mobile device.

The vehicle-based system may have received the initial connection request from the mobile device wirelessly. The subsequent connection request may also be received from the mobile device wirelessly. Wireless connection may be accomplished by any known wireless protocol, e.g., by Bluetooth or WiFi (IEEE 802.11).

According to a second aspect, a method for connecting a vehicle-based system comprising a first device and a second device with a mobile device is presented. For an initial connection request from the mobile device, the mobile device has received a token pair comprising a plaintext token and an encrypted token from the first device. The encrypted token has been obtained by generating an encrypted version of the plaintext token. The method for connecting the vehicle-based system with the mobile device comprises sending a subsequent connection request from the mobile device to the second device of the vehicle-based system. The subsequent connection request includes the token pair comprising the plaintext token and the encrypted token.

The mobile device may be disconnected from the vehicle-based system after the initial connection request. Thus, the mobile device may send the subsequent connection request in order to reconnect with the vehicle-based system.

For the method of connecting the vehicle-based system with the mobile device, the mobile device may further send a unique identifier to the vehicle-based system. The unique identifier may be based on any information indicative of an identity of the mobile device. For example, mobile device serial numbers, a key generated locally by the mobile device, an IMEI, an IMSI, a MAC address and/or a SSL or a TLS client certificate (as defined in, e.g., RFC 5246) may be used to generate the unique identifier.

The method for connecting the vehicle-based system with the mobile device may further have required that the mobile device sent the plaintext token to the vehicle-based system as part of the initial connection request.

The method for connecting the vehicle-based system with the mobile device details the steps taken by a mobile device. The method therefore may be used in conjunction with a corresponding method that is executed by the vehicle-based system. For example, the method may be used in conjunction with the first aspect detailed above, which presents a method for connecting a mobile device with a vehicle-based system. One method may be executed by the vehicle-based system while, and in cooperation with, the mobile device executes a corresponding method. In this way, the two sides of the connection may both take steps toward establishing the connection.

According to a third aspect, a computer program product comprising program code for performing the steps of the method for connecting the mobile device with the vehicle-based system, described herein, is presented. The computer program product may be configured to be executed on a computing device. The computing device may be embodied in the first device and/or the second device of the vehicle-based system. The computer program product may further be stored in a memory of the first device and/or the second device of the vehicle-based system.

According to a fourth aspect, a computer program product comprising program code for performing steps of the method for connecting the vehicle-based system with the mobile device, described herein, is presented. The computer program product is executed on a computing device. The computing device may further be embodied in the mobile device. The computer program product may further be stored in a memory of the mobile device.

According to a fifth aspect a vehicle-based system is presented. The vehicle-based system comprises a first device and a second device that are both in possession of a system key. For an initial connection request between a mobile device and the first device, a token pair comprising a plaintext token and an encrypted token has been provided. The encrypted token is obtainable by applying the system key to at least the plaintext token. The vehicle-based system comprises a memory and a processor.

Instructions are stored on the memory, which when carried out instruct the processor to receive, for a subsequent connection request with the second device and from the mobile device, the token pair comprising the plaintext token and the encrypted token. The stored instructions further instruct the processor to verify the token pair using at least the system key. The stored instructions further instruct the processor to accept the subsequent connection request upon successful verification of the token pair.

The vehicle-based system may be configured, e.g., to carry out the steps of the method for connecting the mobile device with the vehicle-based system, as described herein, or any of the alternative embodiments of the method for connecting the mobile device with the vehicle-based system. The second device may comprise the processor and the memory. The first device may analogously also comprise a processor and a memory.

Further, the vehicle-based system may include the computer program product of the third aspect described herein. The computer program product may be stored in the memory of the vehicle-based system and also executed by the processor included therein.

According to a sixth aspect, a mobile device is presented. For an initial connection request with a vehicle-based system comprising a first device and a second device, the mobile device has received a token pair comprising a plaintext token and an encrypted token. The encrypted token has been obtained from the first device by generating an encrypted version of the plaintext token. The mobile device comprises a memory and a processor. Instructions are stored on the memory, which when carried out instruct the processor to send a subsequent connection request from the mobile device to the second device of the vehicle-based system. The subsequent connection request includes the token pair comprising the plaintext token and the encrypted token.

The vehicle-based system may be configured, e.g., to carry out the steps of the method for connecting the vehicle-based system with the mobile device, as described herein, or any of the alternative embodiments of the method for connecting the vehicle-based system with the mobile device.

Further, the mobile device may include the computer program product of the fourth aspect described herein. The computer program product may be stored in the memory of the vehicle-based system and executed by the processor included therein.

BRIEF DESCRIPTION OF THE DRAWINGS

Embodiments of the technique presented herein are described below with reference to the accompanying drawings, in which.

DETAILED DESCRIPTION

Figure 1:
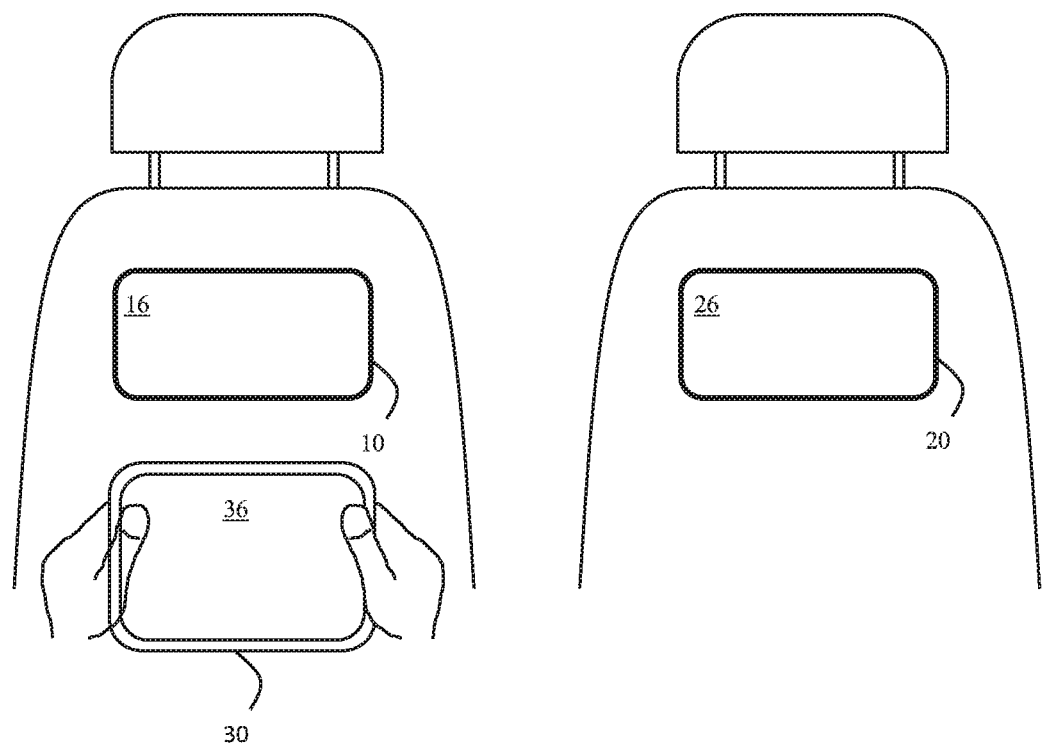
FIG. 1 shows a schematic representation of a vehicle interior.

FIG. 1 shows a vehicle environment, in which a first device 10 and a second device 20 are provided in a vehicle-based system 100. The example of FIG. 1 shows an occupant's perspective from the backseat of a car, in which the first device 10 is installed in the back of a driver seat and the second device 20 is installed in the back of a front passenger seat. The first device 10 comprises a display 16, and the second device 20 comprises a display 26. As such, the two devices 10, 20 may belong to a rear entertainment system and may take the form of, e.g., detachable tablet computers. The first device 10 and the second device 20 are furthermore in possession of a system key.

FIG. 1 also shows a mobile device 30 configured to communicate with each device 10, 20 of the vehicle-based system. Although the mobile device 30 is illustrated being used with devices which are both accessible in the backseat of the vehicle, it should be understood that the first device 10 or the second device 20 may be located anywhere in the vehicle, including in areas which are accessible to the driver or front passenger. Such alternative locations include a dashboard of the vehicle in a central multimedia and/or navigation and/or vehicle control system.

Moreover, while the present disclosure typically describes the various aspects in terms of the first device 10, the second device 20, and the mobile device 30, it should be appreciated that this is done for the sake of illustration and to simplify the disclosure. The present disclosure may relate to any connection request performed by the mobile device 30 with one of any arbitrary number of devices of the vehicle-based system 100.

The mobile device 30, which is external to the vehicle-based system 100, is in use by an occupant of the vehicle. The mobile device 30 comprises a display 36. The mobile device 30 may be used for controlling certain functionalities of the car or for watching media content, such as pictures or video. The mobile device 30 may for example be a mobile phone, tablet, or MP3 player.

It should be appreciated that the displays of the various devices of the vehicle-based system 100 and of the mobile device 30 may include touchscreen functionality. Further, the devices of the vehicle-based system 100 may provide no physical connection ports which the mobile device 30 could otherwise rely upon to connect to the vehicle-based system 100. Accordingly, a wireless connection may be the sole means for connecting the mobile device 30 with one of the devices of the vehicle-based system 100. The wireless connection may be accomplished according to any wireless protocol, such as Bluetooth or WiFi.

The first device 10 may have performed an initial connection request with the mobile device 30. In that process, a token pair comprising a plaintext token and an encrypted token was provided, the encrypted token being obtainable by applying the system key to at least the plaintext token. At a later time, the mobile device 30 may send a subsequent connection request to the second device 20. For example, the occupant may move to the adjacent seat, behind the front passenger, and therefore wish to connect the mobile device 30 with the second device 20. The mobile device 30 therefore includes the token pair comprising the plaintext token and the encrypted token with the subsequent connection request. Upon successfully verifying the token pair using at least the system key, the second device 20 accepts the subsequent connection with the mobile device 30.

Moreover, it should be appreciated that the first device 10 and the second device 20 may be powered on and off as required, or otherwise disconnected from the vehicle-based system 100. This may include physically detaching the first device 10 or the second device 20 from where they are installed. The first device 10 and the second device 20 may be disconnected at any time from the vehicle-based system 100, including while other devices of the vehicle-based system 100 are operating and/or connected to the vehicle-based system 100. However, disconnecting a device which is not involved an ongoing connection will advantageously not prevent a subsequent connection request from later being carried out with the disconnected device, in accordance with the present disclosure.

In this way, it should be understood that the vehicle-based system 100 can be decentralized. For the purpose of at least some aspects of the present disclosure, no communication is required between the devices 10, 20 of the vehicle-based system 100, and each of the devices 10, 20 constituting the system may communicate with the mobile device 30 independently. The devices 10, 20 of the vehicle-based system 100 may thus not even have knowledge of each other.

Figure 2:
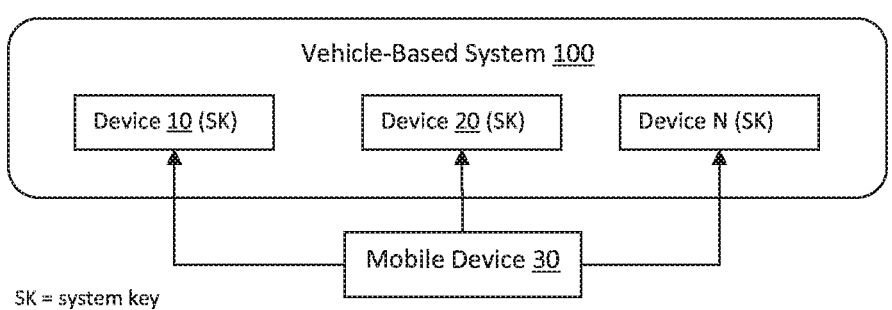
FIG. 2 shows a schematic block diagram of a vehicle-based system.

FIG. 2 provides a schematic block diagram of the structure of the vehicle-based system 100, the first device 10, the second device 20 and an Nth device, which is intended to show that the vehicle-based system 100 may comprise an arbitrary number of devices. Each device of the vehicle-based system 100 is moreover in possession of its own copy of the system key (SK). The mobile device 30 is shown here as being connectable with any device of the vehicle-based system 100. The vehicle-based system 100 can be therefore seen as a distributed server/remote system while the mobile device 30 is a client of the vehicle-based system 100.

In view of FIG. 2, the mobile device 30 may perform an initial connection request with an Nth device of the vehicle-based system 100 and a subsequent connection request with the first device 10, in accordance with the present disclosure.

Figure 3:
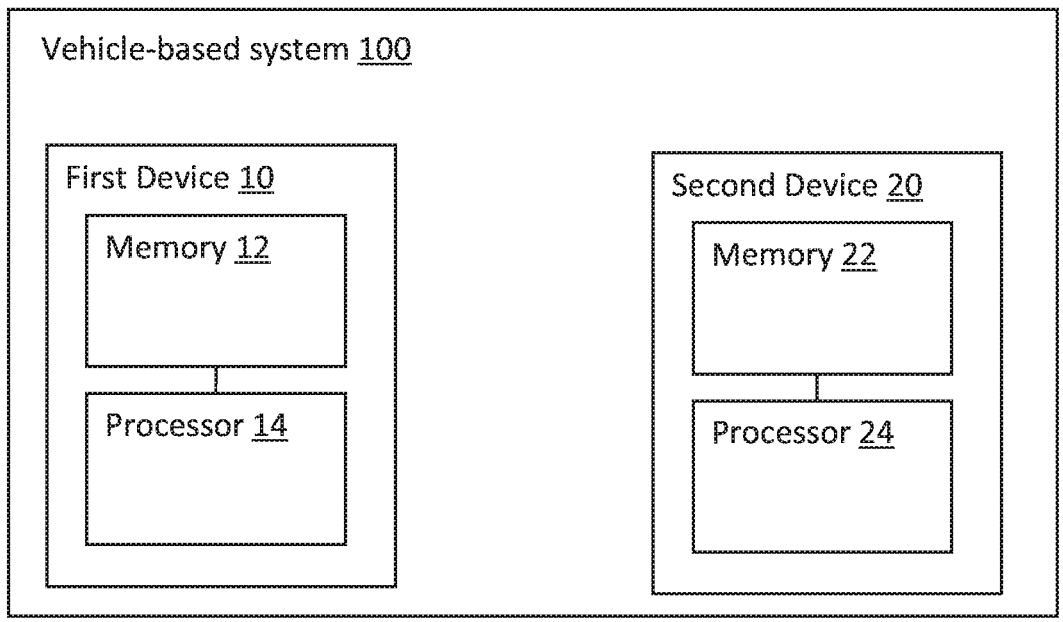
FIG. 3 shows a schematic block diagram of devices in a vehicle-based system.

FIG. 3 shows a block diagram of the vehicle-based system 100 in accordance with the present disclosure. The vehicle-based system 100 comprises the first device 10 and the second device 20. The first device 10 may comprise a memory 12 and a processor 14, wherein the memory 12 and the processor 14 are logically connected such that the processor 14 is configured to perform a method based on instructions stored in the memory 12. The first device 10 may further comprise a plurality of input and/or output interfaces, which are not shown in FIG. 2. The memory 12 may comprise a volatile and/or a non-volatile memory and may comprise, e.g., one or more of an HDD, SDD, RAM, ROM, magnetic storage device, solid state storage device, and optical storage device. The processor 14 may comprise, e.g., one single CPU or a plurality of processors configured to perform the method according to the instructions stored on the memory 12. The memory 12 and the processor 14 are not necessarily physically located on one and the same device but may be distributed over a plurality of devices and logically connected by respective data interfaces. Similarly, the second device 20 comprises a memory 22 and a processor 24, which may be configured in a similar manner.

For an initial connection request from the mobile device 30, the first device 10 has provided the mobile device 30 with a token pair comprising a plaintext token and an encrypted token, the encrypted token being obtainable by applying the system key to at least the plaintext token. A connection may then be established between the first device 10 and the mobile device 30 which includes opening a channel of communication between the two devices.

Further, the memory 22 of the second device 20 stores instructions which when carried out instruct the processor 24 to at least receive, for a subsequent connection request with the second device and from the mobile device, the token pair comprising the plaintext token and the encrypted token, verify the token pair using at least the system key, and accept the subsequent connection request upon successful verification of the token pair.

The vehicle-based system 100, comprising the first device 10 and the second device 20, is therefore configured to carry out a method for connecting a mobile device with a vehicle-based system according to the present disclosure.

Figure 4:
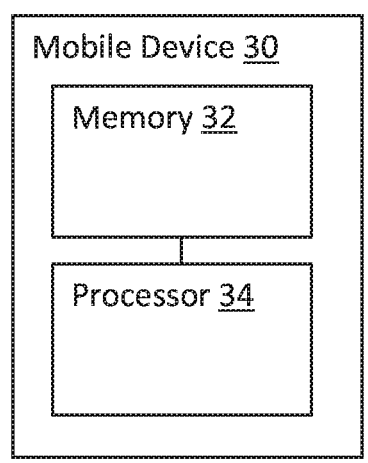
FIG. 4 shows a schematic block diagram of a mobile device.

FIG. 4 shows a block diagram of the mobile device 30 in accordance with the present disclosure. The mobile device 30 comprises a memory 32 and a processor 34, wherein the memory 32 and the processor 34 are logically connected such that the processor 34 is configured to perform a method based on instructions stored in the memory 32. The mobile device 30 may further comprise a plurality of input and/or output interfaces, which are not shown in FIG. 2. The memory 32 may comprise a volatile and/or a non-volatile memory and may comprise, e.g., one or more of an HDD, SDD, RAM, ROM, magnetic storage device, solid state storage device, and optical storage device. The processor 34 may comprise, e.g., one single CPU or a plurality of processors configured to perform the method according to the instructions stored on the memory 32. The memory 32 and the processor 34 are not necessarily physically located on one and the same device but may be distributed over a plurality of devices and logically connected by respective data interfaces.

For an initial connection request from the mobile device 30, the mobile device 30 has received a token pair comprising a plaintext token and an encrypted token from the first device 10. The encrypted token has been obtained by the first device 10 by generating an encrypted version of the plaintext token. A connection may then be established between the first device 10 and the mobile device 30 which includes opening a channel of communication between the two devices.

Further, the memory 32 of the mobile device 30 stores instructions which when carried out instruct the processor 34 to send a subsequent connection request from the mobile device 30 to the second device 20 of the vehicle-based system 100. The subsequent connection request includes the token pair comprising the plaintext token and the encrypted token.

The mobile device 30 is therefore configured to carry out a method for connecting a vehicle-based system comprising a first and a second device with a mobile device according to the present disclosure.

Figure 5:
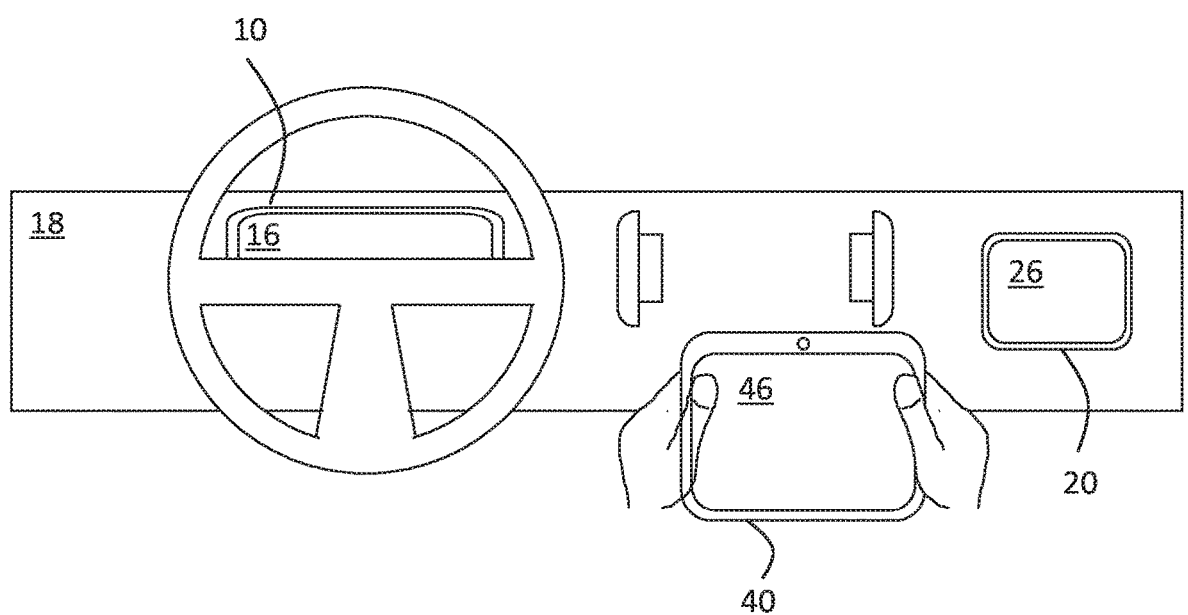
FIG. 5 shows a schematic representation of a vehicle interior.

FIG. 5 shows a vehicle environment from the perspective of a front seat, such as would be available to a driver and a front passenger of the vehicle. The vehicle-based system 100 is shown to include the first device 10 having display 16, the second device 20 having display 26, and a third device 40 having a display 46. As indicated, the third device 40 may be detachable with the dashboard 18. The first device 10 may be oriented to providing entertainment and information appropriate to the driver, while the second device 20 may be similar to the onboard devices described with respect to FIG. 1. The third device 40 may be a navigational device. Each of the three devices 10, 20, 40 is part of the vehicle-based system 100 and in possession of the system key. Thus, although each device 10, 20, 40 provides disparate functions to the passengers of the vehicle, each device 10, 20, 40 would be connectable to the mobile device 30 in accordance with the present disclosure.

Figure 6:
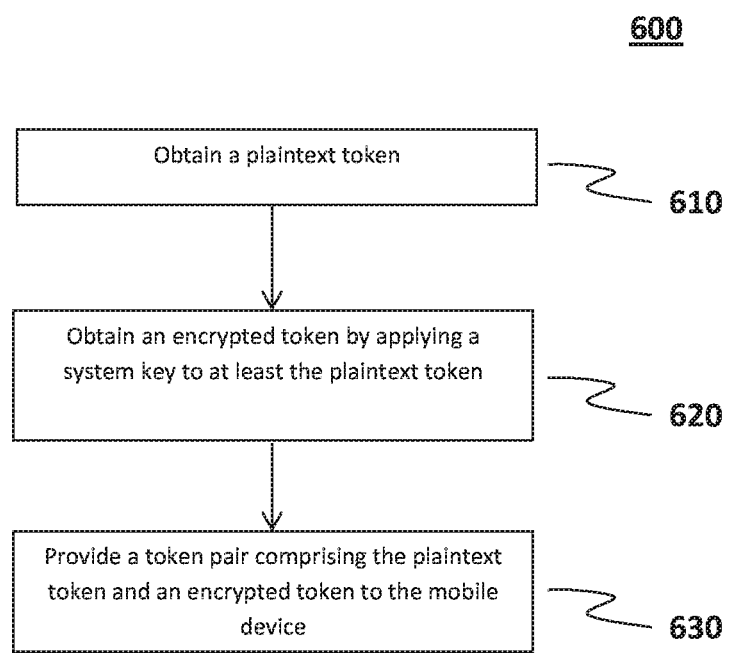
FIG. 6 shows a method for performing an initial connection request.

FIG. 6 shows a method 600 for performing an initial connection request between the mobile device 30 and the vehicle-based system 100. A device of the vehicle-based system 100, for example the first device 10, performs step 610 to obtain a plaintext token. The plaintext token may be a string of plaintext which has been randomly generated by the first device 10. In step 620, the first device 10 may obtain an encrypted token by applying a system key to at least the plaintext token. The system key may be known intrinsically by all devices of the vehicle-based system 100. Thus, the system key may be hard-coded into the first device 10, for use in all initial or subsequent connection requests. In step 630, the first device 10 may then provide a token pair comprising the plaintext token and the encrypted token to the mobile device 30.

Figure 7:
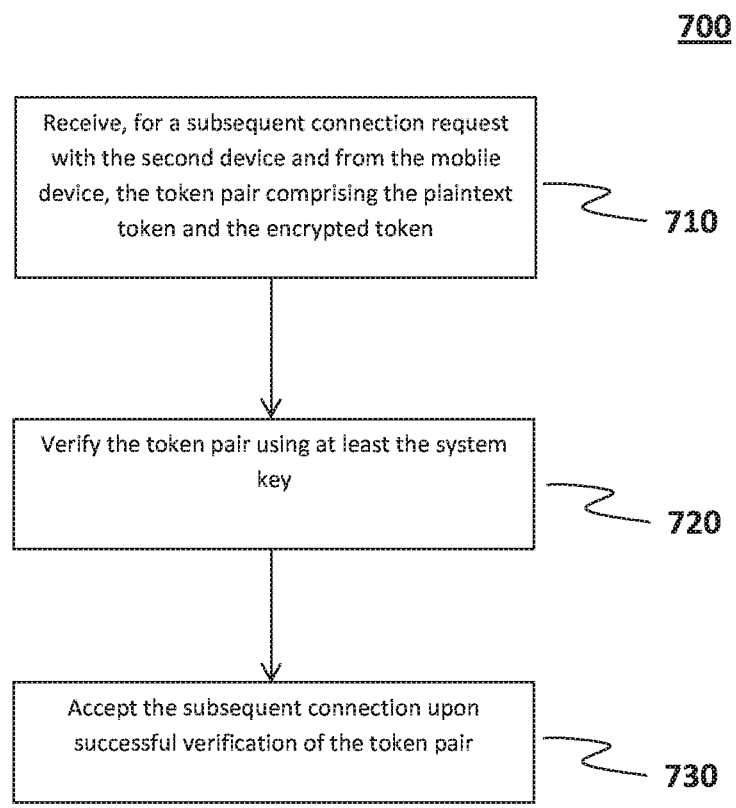
FIG. 7 shows a method for connecting a mobile device with a vehicle-based system.

FIG. 7 shows a method 700 for connecting the mobile device 30 with the vehicle-based system 100. The vehicle based-system 100 comprises the first device 10 and the second device 20, such as previously described. Both the first device 10 and the second device 20 are in possession of a system key. Prior to performing the method 700, an initial connection request has been performed between the first device 10 and the mobile device 30. For example, the method 600 described with reference to FIG. 6 may be relied upon to perform the initial connection request. In accepting the initial connection request, a token pair comprising a plaintext token and an encrypted token was provided to the mobile device 30. The encrypted token is obtainable by applying the system key to at least the plaintext token.

Thus, the first step 710 of the method 700 occurs during a subsequent connection request with the second device 20 and from the mobile device 30. The token pair is received, which comprises the plaintext token and the encrypted token which were previously sent as part of the initial connection request. The next step 720 of the method comprises verifying the token pair using at least the system key.

In the next step 730 of the method 700 the subsequent connection request is accepted upon successful verification of the token pair. The step 730 of verifying the token pair using at least the system key may further comprise the step of encrypting the plaintext token received from the mobile device 30 using the system key. The resulting encryption of the plaintext token is compared to the encrypted token received from the mobile device 30. If the two match, it is nearly certain that the plaintext token received from the mobile device 30 is identical to the one received by the mobile device 30 during a previous connection, such as during the initial connection request. Thus, the second device 20 can establish that the mobile device 30 is already "trusted" and establish the connection with the mobile device 30 using reduced security measures.

While the initial connection request may have required a first user query to accept the connection, the subsequent connection request may be considered safe if the token pair is successfully verified. Therefore, the subsequent connection request may be accepted automatically—i.e., without generating any further user query—or by generating a second user query which requires less user interaction than the first user query. For example, whereas the first user query may have required the user to input a PIN code to accept the initial connection request, the second user query may require the user to simply agree to the subsequent connection request. This could be accomplished by displaying a dialog through either the mobile device 30 or the second device 20, or both, the dialog prompting the user to choose whether they would like to accept the subsequent connection request. It should be appreciated that the second user query may also serve to confirm which of the multiple devices in the vehicle-based system 100 the user intends to connect the mobile device 30 to.

Different levels of user interaction or security may therefore be involved in the user query. Which level is employed may depend on the security requirements of the connection request as well as the trustworthiness of the requester. The user query may further differ based on the device 10, 20 which the user is requesting to connect to. For example, an onboard device which is intended for the driver of the vehicle may use different user queries—e.g., having a higher level of security—than the user queries used by passenger devices.

The method 700 as indicated herein does not attempt to describe every step involved in handling a subsequent connection request. Each step described may include numerous other steps. Moreover, additional steps related to the connection request may occur in addition to and/or in parallel with the steps of the method 400.

Figure 8:
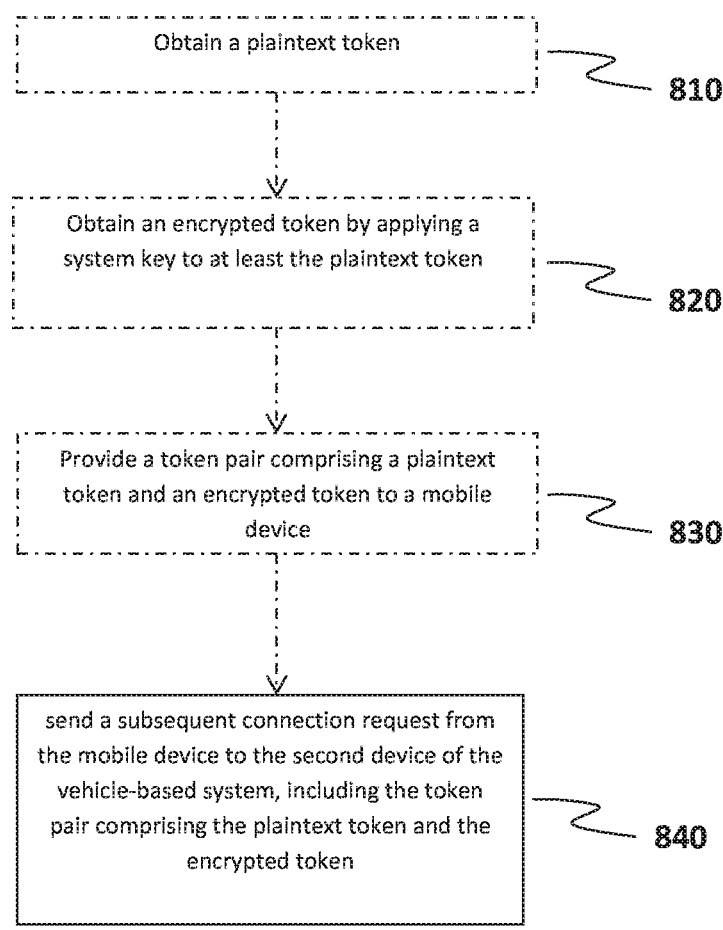
FIG. 8 shows a method for connecting a vehicle-based system with a mobile device method.

FIG. 8 shows a flowchart describing a method 800 which details the steps taken for connecting the vehicle-based system 100 with the mobile device 30. In particular, the steps of method 800 are carried out by the mobile device 30 during a subsequent connection request with one of the devices of the vehicle-based system 100. For example, the mobile device 30 may perform a subsequent connection request with second device 20. Steps 810 through 830 of the method 800 are analogous to the steps of the initial connection request as indicated in steps 610 through 630 of method 600.

As indicated in FIG. 8, however, it is assumed that the initial connection request will have been successfully performed by the time the mobile device 30 initiates the subsequent connection request. In step 840, the subsequent connection request may be sent from the mobile device 30 to the second device 20. In relation to the subsequent connection request, the mobile device 30 may also include the token pair which it previously received during the initial connection request. In accordance with the present disclosure, the token pair comprises the plaintext token and the encrypted token.

After completion of the method 800, the second device 20 of the vehicle-based system 100 may then carry out the method 700 for connecting the mobile device 30 with the vehicle-based system 100, as described above.

Figure 9:
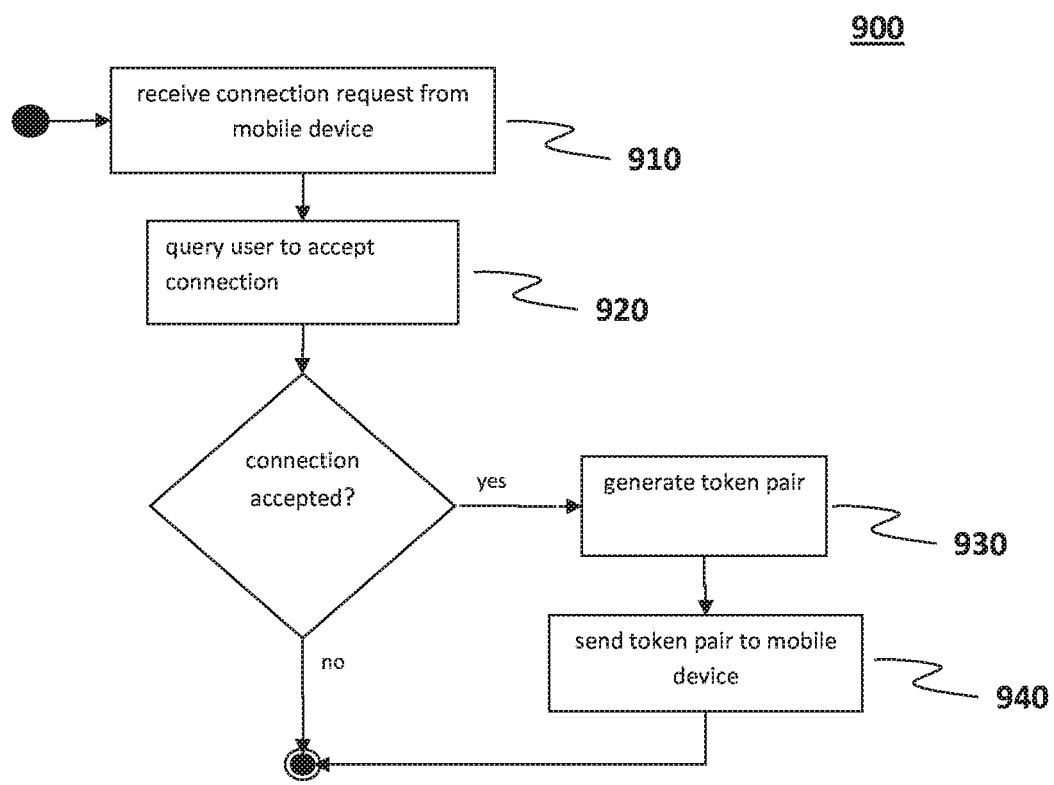
FIG. 9 shows a method for performing an initial connection request.

FIG. 9 shows a flowchart describing a method 900 which details the steps taken in the initial connection request between the first device 10 and the mobile device 30. In step 910, the initial connection request may first be received from the mobile device 30. The initial connection request may be received by the first device 10. In order to specify that the mobile device 30 is to be connected with the first device 10, a user may provide additional information or commands to either the first device 10 or the mobile device 30. For example, the user may directly control the first device 10, via the display 16, to initiate a connection with the mobile device 30. Similarly, the mobile device 30 can contemporaneously or alternatively be commanded to initiate a connection with the first device 10.

Once the initial connection request is received, in step 920 a first user query may be generated and sent to the user in order to accept the connection. This first user query may be generated on the display 16 of the first device 10 or on the display 36 of the mobile device 30. The first user query preferably requires a specific level of user interaction to ensure that the user is authorized to connect with the first device 10 and moreover that the mobile device 30 is authorized to connect with the first device 10. Such user interaction may include outputting a dialog to the first device 10 and the mobile device 30, notifying the user that he is about to connect the devices. Further, the user may be required to positively approve the connection request, such as by inputting a matching PIN code into either the display 16 or the display 36, or both.

If the initial connection request is accepted, step 930 is carried out in which a token pair is generated. This may comprise generating a plaintext token, which may be done by the first device 10 or any other device in the vehicle-based system 100. Alternatively, the mobile device 30 may generate the plaintext token and send the plaintext token to the vehicle-based system 100. Where the mobile device 30 generates the plaintext token, the plaintext token can be included either as part of the initial connection request or in a separate communication. By "plaintext", it is understood that the plaintext token is unencrypted and therefore may be generated by unsecure means. The plaintext token may for example include human-readable text information related to the initial connection request. The plaintext token may further be randomly generated as a number.

Once the vehicle-based system 100 is in possession of the plaintext token, the token pair is generated. The token pair comprises the plaintext token and an encrypted token, which is obtainable by applying the system key to at least the plaintext token. For added security, functionality and/or convenience the system key may be applied to other data in addition to the plaintext token, such as a timestamp and unique identifier, as explained in greater detail below. The mechanism for applying the system key is described below in greater detail with regards to FIGS. 6 and 7.

In step 940 of the method, the generated token pair is then sent to the mobile device 30 for use in a subsequent connection request. The token pair contains at least the plaintext token and the encrypted token. If the plaintext token was generated by the mobile device 30, then it may not be necessary to send the plaintext token back to the mobile device 30.

As indicated in FIG. 9, the initial connection request may not be accepted. For example, the user may expressly reject the request or fail to affirmatively accept the request. In that event, then steps 930 and 940 would not be carried out. Accordingly, the mobile device 30 would not receive a token pair. This would necessarily prevent the steps related to performing a subsequent connection request from being performed, at least in part because the mobile device 30 would not be able to provide a valid encrypted token. If a user still wishes to connect the mobile device 30 with the vehicle-based system 100, the user will need to initiate a further initial connection request and satisfy the user query requirements thereof.

Thus, the initial connection request serves to provide a first measure of security for the vehicle-based system 100. Unless a mobile device provides a counterfeited token pair during a subsequent connection request, the steps of the initial connection request cannot be bypassed. Moreover, devices for which a connection was previously accepted are easily distinguishable from non-approved devices simply on the basis of whether the mobile device possesses a token pair.

Figure 10:
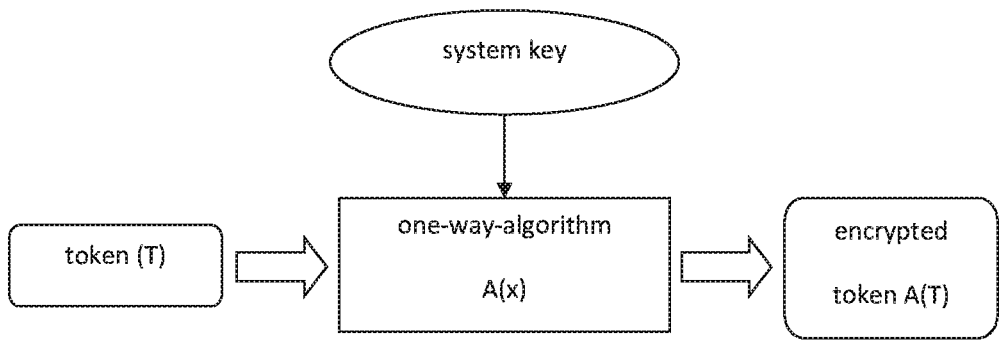
FIG. 10 shows a schematic diagram of the encryption process.

FIG. 10 shows a schematic diagram 1000 of the token pair generation process, such as that described in step 930 of FIG. 9. A plaintext token T is provided with the system key to a one-way algorithm A(x), which generates the encrypted token A(T) by applying at least the system key to the plaintext token T. The one-way algorithm A(x) may be any function capable of taking an input and consistently providing the same output, and where it is infeasible to derive the original input from the output. One-way algorithms are well-known in cryptography as a means for verifying encrypted information. Exemplary one-way algorithms include cryptographic hash functions such as MD5 and SHA, modular exponentiation, and application of elliptic curves. The one-way algorithm relied upon is accordingly not practically invertible.

As long as the system key is consistently applied to the plaintext token T, an encrypted token A(T) will be reliably verified. Therefore, the plaintext token T and the system key are sufficient inputs to create a secure encrypted token A(T) as long as the system key is applied in a way fitting with the one-way algorithm A(x), i.e., such that the level of cryptographic security afforded by the one-way algorithm A(x) is not compromised. For example, the plaintext token T may be concatenated with the system key and then provided to the one-way algorithm A(x).

Modern one-way algorithms are able to encrypt inputs of any length and to output tokens of a predetermined and/or fixed length. Therefore, by relying on one-way algorithm A(x), an arbitrarily long (or arbitrarily short) plaintext token may be relied upon to generate an encrypted token of a consistent length and format.

Given that the plaintext token is shared in a potentially unsecured channel, it should be appreciated that the system key of the vehicle-based system 100 is kept secret. The specific one-way algorithm A(x) relied upon, and the specific way in which the system key is applied to the plaintext token T, can also be kept secret. However, it should be understood that much of the information could also be public, such as the specifics of one-way algorithm A(x) or the plaintext token T. As long as the system key remains secret, then the nature of one-way algorithm A(x) ensures that only the vehicle-based system 100 will be able to generate a valid token pair.

The aspects of the present disclosure ensure that only the plaintext token T and the encrypted token A(T) need to be transmitted to the mobile device 30. Otherwise, only the devices of the vehicle-based system 100 will be able to access the system key directly.

Figure 11:
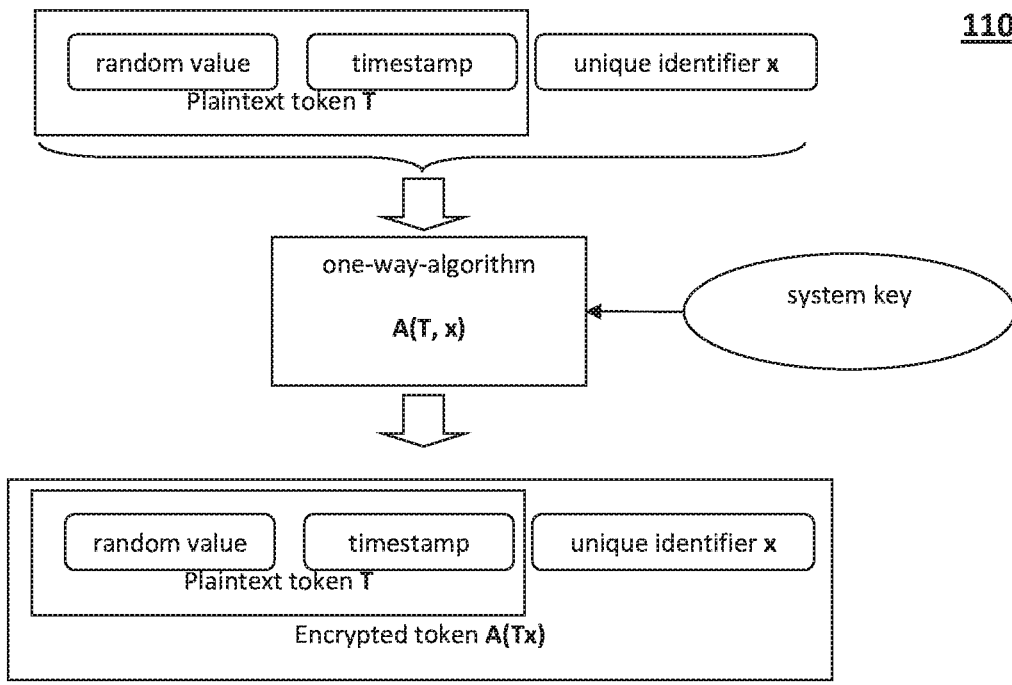
FIG. 11 shows a schematic diagram of the encryption process using a timestamp and a unique identifier.

FIG. 11 shows a further schematic diagram 1100 of the token pair generation process, in which a timestamp and a device unique identifier are also used to generate the encrypted token. This aspect should be understood as a refinement of the schematic 1000 shown in FIG. 10 as it relies on the same principles of cryptographic security. As explained with regard to FIG. 10, one-way algorithms are typically able to use an arbitrary number of inputs. Here, one-way algorithm A(T, x) generates an encrypted token A(Tx) by applying the system key to at least the plaintext token T, here comprising a random value and a timestamp, and unique identifier x. It should be understood that both the timestamp and the unique identifier x being relied upon to generate the encrypted token A(Tx). Alternatively, only one of either the timestamp or the unique identifier x may be relied upon to generate the encrypted token.

The timestamp may have been generated and included with the plaintext token during the initial connection request. As the timestamp is part of the information encrypted by the one-way algorithm A(T, x), it is apparent that the timestamp of the token pair cannot be changed by the mobile device 30 or any other device, without invalidating the token pair with respect to the encrypted token. The timestamp may indicate the time at which the initial connection request was performed with the mobile device 30. Alternatively, the timestamp may indicate an expiration time for the token pair. The timestamp may be updated as a result of subsequent connection requests and connections, which would result in a new token pair having a new encrypted token being sent to the mobile device 30. The timestamp may additionally be updated at any point during a connection. For example, a new token pair based on an updated timestamp may be sent upon closing a connection between the mobile device 30 and the vehicle-based system 100.

As the timestamp is included as part of the plaintext token, both the mobile device 30 and the vehicle-based system 100 can simply check the plaintext token to determine whether the plaintext token is expired. The timestamp may be encoded in accordance with any suitable format, such as Unix time or a system time of the vehicle-based system 100.

The unique identifier x indicated in FIG. 11 may be any data sufficient to uniquely identify the mobile device 30. The unique identifier may for example be derived from the connection between mobile device and the remote system, e.g., by using a MAC address and/or a SSL or a TLS client certificate. If using an authentication certificate, TLS is particularly preferred over SSL, which is deprecated under RFC 7568. Thus, the unique identifier x may itself be generated by encryption.

Figure 12:
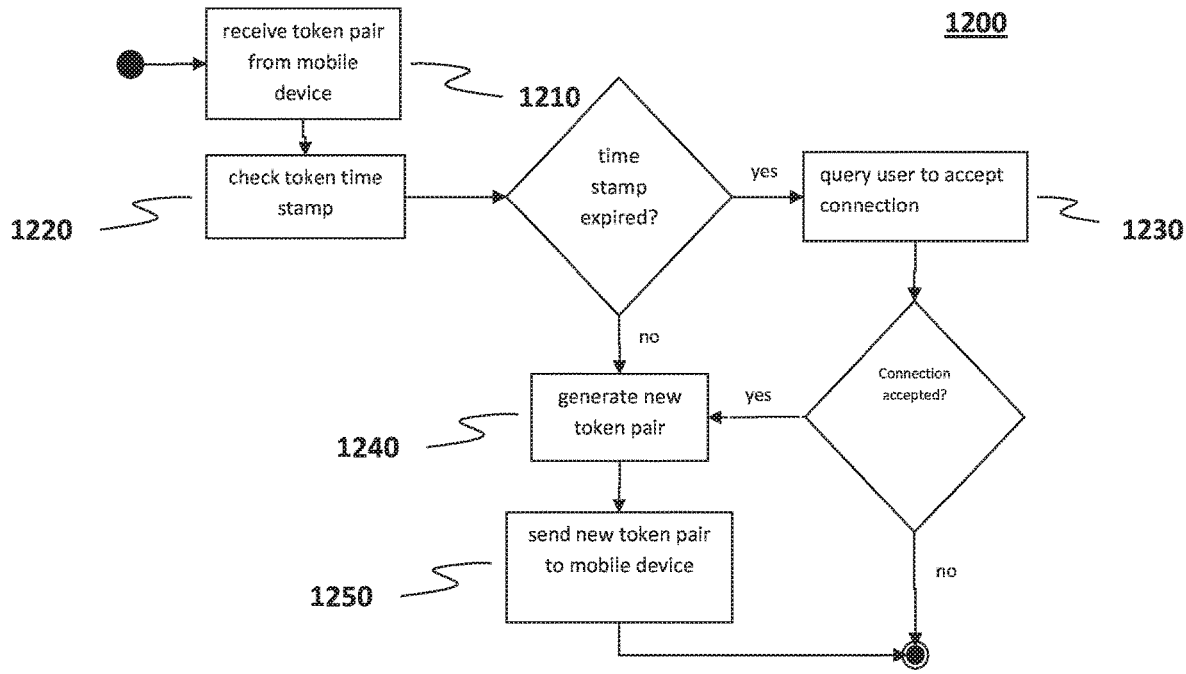
FIG. 12 shows a method for performing a subsequent connection request where a timestamp is used.

Regardless of which inputs are included with or as part of the plaintext token T, the system key will be applied to the inputs in conjunction with a one-way algorithm. The encrypted token generated therefrom can be sent to the mobile device 30 and received by the vehicle-based system 100 in the same way as the purely plaintext token-based encrypted token shown in FIG. 6. Thus, the present disclosure provides a method which can be tailored to a specific level of security without substantial changes to the underlying core mechanisms of the methods and devices of the present disclosure FIG. 12 shows a flowchart describing a method 1200 which details the steps taken in the subsequent connection request between the second device 20 and the mobile device 30 when a timestamp is used. In step 1210, as typically performed at the beginning of a subsequent connection request, the vehicle-based system 100 receives a token pair from the mobile device 30. As before the token pair comprises at least a plaintext token and an encrypted token. The plaintext token contains at least the timestamp.

In step 1220, the timestamp is checked to see if the timestamp is expired. To check this, the timestamp may first need to be parsed out of the plaintext token. Expiration of the timestamp may be indicated by a predetermined time having passed since the time indicated by the timestamp. Where the timestamp indicates the expiration time directly, the timestamp would be compared to the present time of the vehicle-based system 100.

It should be appreciated that the validity of the timestamp included in the plaintext token is also checked in that the timestamp must also match the timestamp which was sent with the earlier token pair to the mobile device 30. In this regard checking the timestamp is accomplished analogously to how the plaintext token, as a whole, is verified. For example, as explained with respect to step 720 of the method 700, the plaintext token which was received from the mobile device 30 is encrypted using the system key. The resulting encryption of the plaintext token is compared to the encrypted token received from the mobile device 30. If the match is successful then the plaintext token received from the mobile device 30 is valid. If the match is not successful, then this would be an indication that some part of the plaintext token, such as the timestamp, is incorrect.

It should be appreciated that checking the timestamp for expiration and validity can be performed in any order, or in parallel, by the various devices of the vehicle-based system 100. In particular, if the subsequent connection request is being performed between the mobile device 30 and the second device 20, then the second device 20 may check the validity of the timestamp.

If the timestamp and the token pair are found to be valid, then method 1200 proceeds to step 1240, in which a new token pair is generated. The new token pair includes a plaintext token having at least a new timestamp, possibly in combination with new randomly-generated plaintext. As before, the system key is applied to the new plaintext token using the one-way algorithm to generate an encrypted token. In step 1250, the plaintext token and the encrypted token are sent to the mobile device 30 as a token pair.

If it is determined in step 1220 that the timestamp is expired, then the user may be queried to accept the connection in step 1230. Such a query could entail a level of user interaction similar to that required in the first user query or second user query, as described with respect to FIG. 4. Alternatively, a third user query requiring a different level of user interaction, motivated by the timestamp being expired but the token pair being otherwise valid, may be relied upon. If the user accepts the connection in step 1230, then the method 1200 proceeds to steps 1240 and 1250 as indicated above.

It is noted that if the token pair is not valid due to the encrypted token being incorrect, then it may be determined that the connection request must be restarted from the beginning, as with an initial connection request. This would apply even if the timestamp itself is not expired, since an incorrect encryption token implies that the mobile device 30 has not previously been involved in an accepted connection request. Thus, a level of user interaction corresponding to the first user query would be required.

Figure 13:
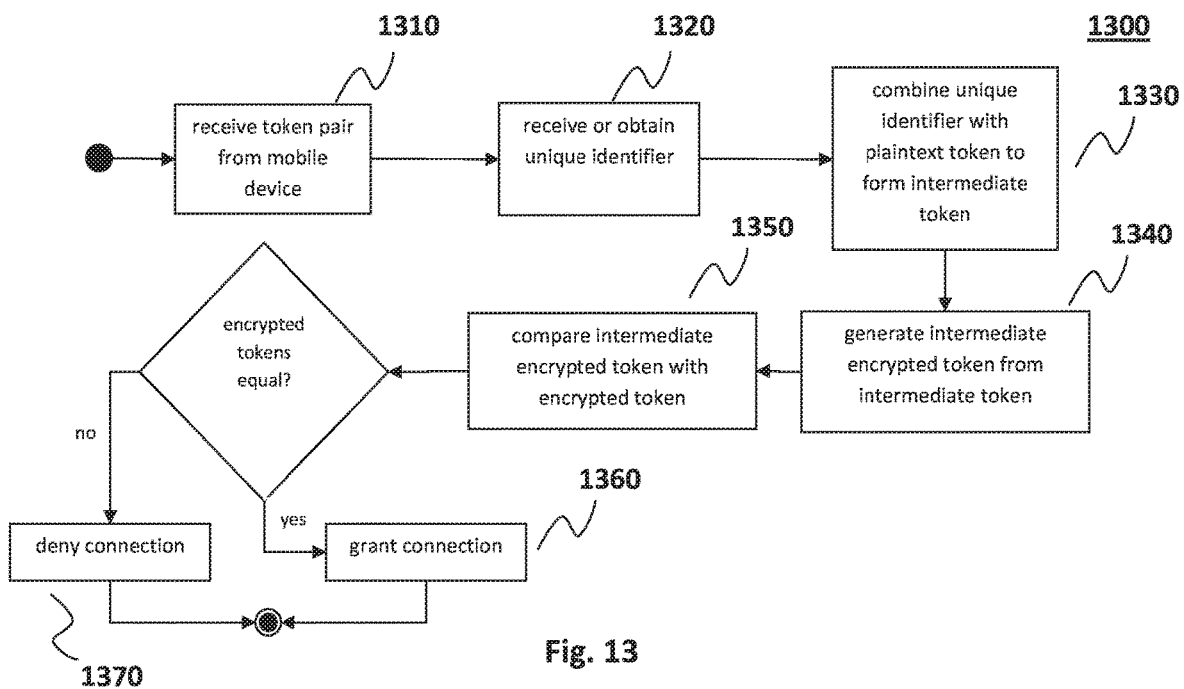
FIG. 13 shows a method for performing a subsequent connection request where a device unique identifier is used.

FIG. 13 shows a flowchart describing a method 1300 which details the steps taken when a unique identifier is used to verify a token pair. The method 1300 may be carried out as part of a subsequent connection request. As indicated with regard to FIG. 11, a unique identifier x may be encrypted with the token plaintext T, although the two may not be sent together. Because the unique identifier is known to the mobile device 30, it is not necessary for it to be sent as part of the token pair generated by the vehicle-based system 100. Thus, a device would be prevented in part from mimicking the mobile device 30 unless it is capable of providing the unique identifier to the vehicle-based system 100.

In a first step 1310, the vehicle-based system 100 receives a token pair from the mobile device 30. As in others aspects of the present disclosure, the token pair comprises a plaintext token and an encrypted token. The plaintext token may comprise both plaintext and a timestamp. In step 1320, the unique identifier is received or obtained by the vehicle-based system 100. In some cases, e.g., where a digital certificate is used to identify the mobile device 30, the unique identifier may be obtained from a third party. In the case of a digital certificate the third party may be a certification authority. In step 1330, the unique identifier is combined with the plaintext token to form an intermediate token.

This intermediate token may then be checked in a way similar to embodiments of the present disclosure where only a plaintext token and an encrypted token is verified, such as described with respect to step 730 of method 700. In step 1340, an intermediate encrypted token is generated from the intermediate token. In step 1350, the intermediate encrypted token is compared with the encrypted token received as part of the token pair in step 1310.

If the intermediate encrypted token and the received encrypted token match, then the connection is granted in step 1360. However, if the two do not match then the connection is not granted on the sole basis of the token pair and the unique identifier, as indicated in step 1370. The user of the mobile device 30 may then be prompted to connect to the vehicle-based system 100 using, e.g., the first user query.

With the approach proposed herein, a technique is provided which enables a user of a mobile device in a vehicle to securely and yet conveniently enjoy access to a vehicle-based system. While the embodiments have primarily been described in the context of connecting a mobile device with a vehicle-based system (e.g., comprising one or more vehicle-based multimedia devices and/or vehicle-based infotainment devices and/or one or more driver assistance devices), it will be appreciated that the present disclosure is not limited to a vehicle-based implementation. Accordingly, the present disclosure could also be implemented in connection with any system comprising at least a first device and a second device outside a vehicle context.

The invention claimed is:

1. A method for connecting a mobile device with a first device and a second device of a vehicle-based system, wherein the first device and the second device of the vehicle-based system are configured to provide disparate functions to a passenger of the vehicle-based system and are both in possession of a system key, that, for an initial connection request to connect the first device and the mobile device initiated in response to a user input, has provided a token pair comprising a plaintext token and an encrypted token, the system key being applied to at least the plaintext token to obtain the encrypted token, the method comprising:

receiving, for a subsequent connection request with the second device and from the mobile device, the token pair comprising the plaintext token and the encrypted token;

verifying the token pair using at least the system key; and accepting the subsequent connection upon successful verification of the token pair, wherein the first device is not connected to the vehicle-based system when the subsequent connection is performed with the second device, or wherein the second device is not connected to the vehicle-based system when the initial connection is performed with the first device, wherein the initial connection has been performed subject to a first user query, and the subsequent connection is performed one of automatically without generating any user query or by generating a second user query that requires less user interaction than the first user query.

2. The method of claim 1, wherein verifying the token pair using at least the system key comprises:

encrypting the plaintext token received from the mobile device using the system key; and comparing the resulting encryption of the plaintext token to the encrypted token received from the mobile device.

3. The method of claim 1, wherein a timestamp has been included in the plaintext token during the initial connection request; and the timestamp is checked for expiry when the subsequent connection is performed.

4. The method of claim 3, further comprising the steps of:

generating a new token pair having a new timestamp, if the timestamp is not expired; and transmitting the new token pair to the mobile device.

5. The method of claim 3, further comprising the step of:

generating a third user query requiring as much user interaction as the first or second user query, to accept the subsequent connection, if the timestamp is expired.

6. The method of claim 1, wherein the encrypted token is obtainable using a one-way algorithm using at least the system key and the plaintext token.

7. The method of claim 1, further comprising the step of applying the system key to the plaintext token and to a unique identifier indicative of an identity of the mobile device to obtain the encrypted token.

8. The method of claim 7, further comprising receiving the unique identifier from the mobile device, wherein verifying the token is based at least on the received unique identifier, the plaintext token, the encrypted token and the system key.

9. The method of claim 1, wherein the same system key is used for all connection requests.

10. The method of claim 1, wherein at least a portion of the plaintext token has been randomly generated.

11. The method of claim 1, further comprising the step of:

establishing an encrypted connection between the vehicle-based system and the mobile device.

12. A method for connecting a first device and a second device of a vehicle-based system with a mobile device configured to communicate with the vehicle-based system, the first device and the second device of the vehicle-based system being configured to provide disparate functions to a passenger of the vehicle-based system, the method comprising:

sending an initial connection request to the first device, the initial connection request being a request to connect with the first device that is initiated in response to a user input;
receiving a token pair comprising a plaintext token and an encrypted token, wherein the encrypted token having been obtained from the first device by generating an encrypted version of the plaintext token;
sending a subsequent connection request from the mobile device to the second device of the vehicle-based system, wherein the subsequent connection request includes the token pair comprising the plaintext token and the encrypted token,
wherein the initial connection has been performed subject to a first user query, and the subsequent connection is performed one of automatically without generating any user query or by generating a second user query that requires less user interaction than the first user query.

13. The method of claim 12, wherein the mobile device is disconnected from the vehicle-based system after the initial connection request.

14. The method of claim 12, wherein the mobile device sends the subsequent connection request in order to reconnect with the vehicle-based system.

15. The method of claim 12, wherein the mobile device has sent the plaintext token to the vehicle-based system as part of the initial connection request.

16. A non-transitory computer-readable medium that includes instructions, which when executed on a computing device, perform a method for connecting a first device and a second device of a vehicle-based system with a mobile device configured to communicate with the vehicle-based system, the first device and the second device of the vehicle-based system being configured to provide disparate functions to a passenger of the vehicle-based system, the method comprising:
sending an initial connection request to the first device, the initial connection request being a request to connect with the first device that is initiated in response to a user input;
receiving a token pair comprising a plaintext token and an encrypted token, wherein the encrypted token having been obtained from the first device by generating an encrypted version of the plaintext token;
sending a subsequent connection request from the mobile device to the second device of the vehicle-based system, wherein the subsequent connection request includes the token pair comprising the plaintext token and the encrypted token,
wherein the initial connection has been performed subject to a first user query, and the subsequent connection is performed one of automatically without generating any user query or by generating a second user query that requires less user interaction than the first user query.

17. A vehicle-based system comprising a first device and a second device that are configured to provide disparate functions to a passenger of the vehicle-based system and that are both in possession of a system key that, for an initial connection request to connect between a mobile device and the first device initiated in response to a user input, has provided a token pair comprising a plaintext token and an encrypted token, the encrypted token being obtainable by applying the system key to at least the plaintext token, comprising:
a memory and a processor, wherein instructions are stored on the memory, which when carried out instruct the processor to:
receive, for a subsequent connection request with the second device and from the mobile device, the token pair comprising the plaintext token and the encrypted token;
verify the token pair using at least the system key; and
accept the subsequent connection request upon successful verification of the token pair,
wherein the first device is configured to be not connected to the vehicle-based system when the subsequent connection is performed with the second device, or wherein the second device is configured to be not connected to the vehicle-based system when the initial connection is performed with the first device, and
wherein the initial connection has been performed subject to a first user query, and the subsequent connection is performed one of automatically without generating any user query or by generating a second user query that requires less user interaction than the first user query.

18. A mobile device configured to communicate with a first device and a second device of a vehicle-based system, the first device and the second device of the vehicle-based system being configured to provide disparate functions to a passenger of the vehicle-based system, comprising:
a memory and a processor, wherein instructions are stored on the memory, which when carried out instruct the processor to:
send an initial connection request to the first device, the initial connection request being a request to connect with the first device initiated in response to a user input;
receive a token pair comprising a plaintext token and an encrypted token, the encrypted token having been obtained from the first device by generating an encrypted version of the plaintext token;
send a subsequent connection request from the mobile device to the second device of the vehicle-based system, wherein the subsequent connection request includes the token pair comprising the plaintext token and the encrypted token,
wherein the initial connection has been performed subject to a first user query, and the subsequent connection is performed one of automatically without generating any user query or by generating a second user query that requires less user interaction than the first user query.

* * * * *